United States Patent
Van Oost et al.

(10) Patent No.: US 10,009,805 B2
(45) Date of Patent: Jun. 26, 2018

(54) METHOD OF CONTROLLING HANDOVER IN MOBILE COMMUNICATION NETWORKS AND APPARATUS AND SYSTEM IMPLEMENTING THE METHOD

(71) Applicant: THOMSON LICENSING, Issy les Moulineaux (FR)

(72) Inventors: Koen Van Oost, Borsbeek (BE); Frederik Verwaest, Mol (BE)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days. days.

(21) Appl. No.: 15/301,985

(22) PCT Filed: Mar. 9, 2015

(86) PCT No.: PCT/EP2015/054835
§ 371 (c)(1),
(2) Date: Oct. 5, 2016

(87) PCT Pub. No.: WO2015/154927
PCT Pub. Date: Oct. 15, 2015

(65) Prior Publication Data
US 2017/0188271 A1     Jun. 29, 2017

(30) Foreign Application Priority Data
Apr. 7, 2014 (EP) .................................... 14305500

(51) Int. Cl.
*H04W 36/00* (2009.01)
*H04W 48/16* (2009.01)
(Continued)

(52) U.S. Cl.
CPC ....... *H04W 36/0066* (2013.01); *H04W 28/16* (2013.01); *H04W 36/0033* (2013.01);
(Continued)

(58) Field of Classification Search
CPC ..... H04W 36/00; H04W 84/12; H04W 92/20; H04W 48/16
(Continued)

(56) References Cited

U.S. PATENT DOCUMENTS 6,469,991 B1   10/2002  Chuah
7,020,439 B2 *  3/2006  Sinivaara .............. H04W 48/20
                                                        370/332
(Continued)

FOREIGN PATENT DOCUMENTS

EP        1601221       11/2005
KR       983049 B1       9/2010
(Continued)

OTHER PUBLICATIONS

Berenzin et al., "Multichannel Virtual Access Points for Seamless Handoffs in IEEE 802.11 Wireless Networks", Vehicular Technology Conference, San Francisco, California, USA, Sep. 5, 2011, pp. 1-5.

(Continued)

*Primary Examiner* — Marceau Milord
(74) *Attorney, Agent, or Firm* — Patricia A. Verlangieri; Jerome G. Schaefer (57) ABSTRACT

In a wireless communication system comprising a mobile terminal and at least two access points, each access point is adapted to provide data communication with the mobile terminal within a service area of the access point through a wireless interface over a selected one of a number of channels. A method of controlling selection of an access point comprises controlling one or more further access points having service areas adjacent or overlapping with a service area of a first access point, to which a first mobile terminal is associated, to send probe request messages to the first mobile terminal, and determining, for each of the one or (Continued)

more further access points and from a response received from the first mobile terminal in response to the corresponding probe request message, a respective first value representing a quality of a connection between the respective access point and the first mobile terminal. Selected ones of the one or more further access points are controlled to accept a future association request from the first mobile terminal, while the not selected access points are controlled to reject a future association request from the mobile terminal.

14 Claims, 4 Drawing Sheets

(51) Int. Cl.
  *H04W 28/16* (2009.01)
  *H04W 72/04* (2009.01)
  *H04W 48/20* (2009.01)
  *H04W 84/12* (2009.01)
  *H04W 92/20* (2009.01)

(52) U.S. Cl.
  CPC ... *H04W 36/0072* (2013.01); *H04W 36/0077* (2013.01); *H04W 48/16* (2013.01); *H04W 48/20* (2013.01); *H04W 72/0406* (2013.01); *H04W 84/12* (2013.01); *H04W 92/20* (2013.01)

(58) Field of Classification Search
  USPC .............................. 455/436, 435.1, 411, 439
  See application file for complete search history.

(56) References Cited

U.S. PATENT DOCUMENTS

| | | | | |
|---|---|---|---|---|
| 7,403,506 | B2* | 7/2008 | Lee | H04W 36/32 370/328 |
| 7,450,544 | B2* | 11/2008 | Rue | H04L 29/12028 370/331 |
| 7,512,379 | B2 | 3/2009 | Nguyen | |
| 7,991,002 | B2* | 8/2011 | Lee | H04W 36/0066 370/331 |
| 8,050,678 | B2* | 11/2011 | Lin | H04L 63/0823 370/331 |
| 8,054,798 | B2* | 11/2011 | Jeong | H04W 48/14 370/331 |
| 8,055,264 | B2* | 11/2011 | Yao | H04W 36/36 370/328 |
| 9,178,722 | B1* | 11/2015 | Gong | H04W 36/0088 |
| 9,538,442 | B2* | 1/2017 | Jung | H04W 36/14 |
| 2002/0193133 | A1 | 12/2002 | Shibutani | |
| 2003/0134642 | A1 | 7/2003 | Kostic et al. | |
| 2005/0041588 | A1 | 2/2005 | Kim et al. | |
| 2006/0092888 | A1 | 5/2006 | Jeong et al. | |
| 2006/0217067 | A1 | 9/2006 | Helbig | |
| 2010/0111069 | A1 | 5/2010 | Torsner et al. | |
| 2015/0249950 | A1* | 9/2015 | Teyeb | H04W 36/0016 455/437 |
| 2015/0319661 | A1* | 11/2015 | Jung | H04W 36/14 455/436 |
| 2015/0373603 | A1* | 12/2015 | Jung | H04W 36/14 370/331 |
| 2016/0013501 | A1* | 1/2016 | Hirakawa | H01M 8/0618 429/423 |
| 2016/0165428 | A1* | 6/2016 | Lee | H04W 8/20 455/434 |
| 2016/0295483 | A1* | 10/2016 | Jung | H04W 28/08 |
| 2016/0353361 | A1* | 12/2016 | Jung | H04W 48/12 |

FOREIGN PATENT DOCUMENTS

| | | |
|---|---|---|
| WO | WO200163842 | 8/2001 |
| WO | WO2004064439 | 7/2004 |
| WO | WO2014029780 | 2/2014 |
| WO | WO2014029870 | 2/2014 |

OTHER PUBLICATIONS

Anonymous, "IEEE Standard for Information technology-Telecommunications and information exchange between systems Local and metropolitan area networks-Specific requirements, Part 11: Wireless LAN Medium Access Control (MAC) and Physical Layer (PHY) Specifications, Amendment 2: MAC Enhancements for Robust Audio Video Streaming", IEEE Standard 802.11aa-2012, May 29, 2012, pp. 1-162.

Chan et al., "The Design of an AP-Based Handoff Scheme for IEEE 802.11 WLANs", Internation Journal of e-Education, e-Business, e-Management and e-Learning, vol. 4, No. 1, Feb. 2014, pp. 72-76.

Berezin et al., "Multichannel Virtual Access Points for Seamless Handoffs in IEEE 802.11 Wireless Networks", Vehicular Technology Conference, San Francisco, California, USA, Sep. 5, 2011, pp. 1-5.

Anonymous, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: MAC Enhancements for Robust Audio Video Streaming", IEEE Standard 802.11aa-2012, May 29, 2012, pp. 1-162.

* cited by examiner

METHOD OF CONTROLLING HANDOVER IN MOBILE COMMUNICATION NETWORKS AND APPARATUS AND SYSTEM IMPLEMENTING THE METHOD

This application claims the benefit, under 35 U.S.C. §365 of International Application of PCT/EP2015/054835, filed Mar. 9, 2015, which was published in accordance with PCT Article 21 (2) on Oct. 15, 2015, in English, and which claims the benefit of European Application No. 14305500.2, filed Apr. 7, 2014.

FIELD OF THE INVENTION

The invention relates to mobile communication networks and, more specifically to handover of a mobile terminal between access points of a mobile communication network for allowing roaming of a mobile terminal attached to the mobile communication network.

BACKGROUND OF THE INVENTION

In order to provide true mobility for a device connected to a wireless communication network across a large area, wireless data access for the area must be provided by a plurality of access points, or AP. In order to be able to provide data communication, a mobile terminal must first join the network. In this process, which is commonly termed association, the mobile terminal, or MT, associates with one of the APs in its neighborhood. At any given instant a particular AP, i.e. the one with which the MT is associated, acts as the serving AP for the MT. A MT is typically associated to a single AP at any time. Once the connection between the MT and the AP that the MT is currently associated to is beginning to fail to provide proper communication service, e.g. when the MT moves out of a service area in which the AP provides a good signal, it may be about time to disassociate the MT from the current AP and to connect and associate the MT to a different AP providing a better signal, e.g. a stronger signal or a signal suffering less from disturbance or interference, and thus providing proper communication service.

Typically an environment with multiple APs has each of these APs operating on a different, non-overlapping channel in order to avoid that the APs are creating hidden nodes among each other.

Many wireless networks commonly used today provide services to a plurality of devices. While a single AP can typically provide mobile communication services to multiple devices in a time-shared manner using the same channel, as discussed above each one of a number of neighboring APs uses a different channel in order to avoid interferences between APs or hidden nodes. A channel in this context corresponds to a single frequency or to a range of frequencies centered around a nominal center frequency. The physical wireless interfaces of APs and MTs are typically adapted to transmit and receive within one or more frequency ranges extending across multiple adjacent channels. The service areas of neighboring APs typically overlap so as to provide gapless communication service for a large area. The APs are connected to and communicate with each other over a backbone network, which may be wired, e.g. a local area network (LAN), or wireless. The backbone network also connects the wireless network to other networks, e.g. the Internet, providing a plurality of services to MTs attached to the wireless communication network.

IEEE802.11-enabled equipment, i.e. wireless LAN, or WLAN equipment, and also equipment adapted to communicate over other types of wireless networks, uses either active or passive discovery procedures for associating to APs. In the following, typical current implementations of the association procedure are discussed briefly. In the simplest embodiment, the MT selects the first AP it detects, i.e. when the MT is turned on, it starts to scan the channels available in the geographical area in question and selects the first AP it receives. In a more sophisticated approach, the selection is based on the information obtained from the transmissions of a plurality of APs. The MT utilizes either active or passive scanning in order to detect the APs in the region. In active scanning, the MT sends a message called a probe request on each channel. When an AP receives a probe request message, it returns a probe response to the MT. In passive scanning, the MT finds the network simply by listening for traffic on a channel, e.g. the beacon messages, which are periodically broadcast by each AP, or data traffic between other MTs and the AP. Utilizing the above-described active or passive scanning, the MT scans the channels and examines the information transmitted in the or in the other data traffic, beacon frames, or in the probe response frames, which allow for obtaining or deriving information about the properties of the AP, such as parameters indicating the security functions of the AP. The MT determines and stores a parameter termed a RSSI (Received Signal Strength Indicator) which indicates the received signal level on the link to the AP. Signal strength is an important parameter and is simple to determine even if no association is established. Also, the fact that APs apply interference monitoring and interference mitigation in their respective used channels makes signal strength an important parameter. Having finished the scanning process, the MT selects the AP with the maximum RSSI, provided that the AP fulfills other requirements set by the MT. In other words, the MT assumes that as long as the characteristics of the AP are suitable for the MT, the AP with the best RSSI provides the best quality of service.

Another important attribute of wireless networks covering a large area is the overlapping of the coverage areas, i.e. cells, of the neighboring APs, since the overlap enables roaming between the cells. When a mobile user with a MT moves beyond the coverage area of the currently serving AP, the MT must associate itself with a new AP. This process of transferring an established association from one AP to another is commonly termed re-association, or handover, and obviously also includes disassociation from a previously associated AP.

This handover process is initiated either by the AP or by the MT, whenever the AP or the MT determines that the connection, or link, is 'bad', i.e. no longer provides the desired service at a desired performance level, or no longer provides the service at all. For roaming, the existing association between the AP and the MT must be disassociated, either triggered by the MT or the AP, and a new association between the MT and a new AP must be established.

However, the assumption that the AP with the maximum RSSI provides the best quality of service may lead to a situation where an overwhelming majority of the MTs is associated with a few APs, while some of the APs are substantially idle. Other reasons may exist why association of MTs to one of a plurality of APs within a coverage area of a wireless network needs to be controlled by the network rather than to be left to the discretion of the algorithm implemented in the MT.

Load sharing mechanisms have been developed, which result in a more uniform load distribution between the APs, i.e. in a more even distribution of the MTs between all APs. Some existing load sharing mechanisms are based on load information sent by the APs in the beacon or probe response frames, the load information indicating the current load of the AP. The load information typically indicates the number of MTs currently associated with the AP. The load information is useful, especially in areas where the cells overlap or in congested areas requiring a multi-cell structure, i.e. where several APs cover essentially the same area.

The above-mentioned use of load information is disclosed in U.S. Pat. No. 6,469,991, for example. This document discloses a wireless communication system in which the beacon message that is broadcast from an AP includes information about the capabilities of the AP, and possibly also load metric information, which generally contains the number of MTs associated with the AP. Based on the information in the beacon message, the MT chooses the AP with which it wants to associate.

It is further known to transmit various connection attributes from the APs, the selection of the AP being based on the said attributes. International patent application WO01/63842 discloses a method in which the connection is kept in the same network as long as possible. The MT receives the said attributes from several networks and selects two APs: a first AP, which has the best connection attributes in the network that is the network of the currently serving AP and a second AP, which has the best connection attributes in another network than the network of the currently serving AP. The MT compares one or more connection attributes of the first and second APs and then re-associates with the second AP if the difference between the connection attributes of the two APs fulfills predetermined criteria. In this way, the connection can be kept in the serving network as long as possible.

Generally, a major drawback relating to the above-described known methods for joining the network and re-associating with an AP is that the decision on the correct AP can only be made on the basis of the fixed capabilities and the current load of the APs available for the MT.

Furthermore, since the present WLAN networks rely on absolute values of the attributes, such as the load of the AP or the signal level of the serving link, short-term deviations from the overall level of service in the cell may cause undesirable association or re-association decisions. For example, a short-term silent period on a channel or a short-term drop in the load level of the AP may cause such decisions.

Since the discovery procedure is typically initiated by the MT, and an AP or a network comprising a plurality of APs is merely responding to the MT-initiated discovery, another major drawback is that the final decision with which AP to associate is made in the MT, and the network has little to no control over the outcome of this process.

Yet another drawback of existing solutions is the fact that current APs are typically operational in a single channel. Thus, such AP can monitor a link quality on that channel, but cannot monitor the link quality on a different channel at the same time. Since neighboring APs typically operate on different channels, two neighboring APs cannot establish a link quality assessment with a MT within range of both APs that is associated with one of the APs.

M. E. Berezin et al., in "Multichannel Virtual Access Points for Seamless Handoffs in IEEE 802.11 Wireless Networks", Vehicular Technology Conference (VTC Spring), 2011 IEEE 73$^{rd}$, 15-18 May 2011, discloses a method of controlling handover between different APs, in which neighboring APs are switched to a currently handling APs channel and listen on that channel for determining a link quality. The listening APs communicate their results to the currently handling AP, which selects a suitable one and tells a connected MT to switch to the selected AP. This method requires accordingly adapted MTs, which can respond to a dedicated handover command.

The objective of the present invention is to alleviate or eliminate the above-mentioned drawbacks.

SUMMARY OF THE INVENTION

In the context of a wireless communication network as described above, the invention provides a method that enables a wireless communication network infrastructure operator to control the association or handover process between a MT and different APs while still leaving the initiation of the association or handover process and/or the final selection of an AP to associate with to the MT. This process does not require any modification to the MT and is thus compatible with the majority if not all MT that are already deployed.

An AP, provided it is not currently busy or even overloaded with data packet transmission or reception, will typically have spare time available for performing 'other tasks', e.g. for scanning the environment around the AP, in between packet transmission or reception. In order to perform such an task an AP quickly switches to another channel, listens to beacons from other networks for a fixed duration, e.g. 250 ms for a passive scan, and then switches back to the previously selected channel for continuing packet transmission/reception.

In accordance with an aspect of the invention the capability of performing other tasks while serving an active network is used for performing a basic link quality assessment with one or more MTs on other channels, also referred to as off-channel assessment. For example, assessment of link quality in its basic form can be had by determining the RSSI of a signal of a peer node.

As the actual off-channel time determines the maximum sustainable packet handling rate for transmissions in the original channel it is desirable for a link quality check task to minimize the off-channel time, e.g. less than 2 ms, and to implement an active evaluation mechanism rather than performing simple passive listening. Such active evaluation improves the accuracy of the RSSI value as multiple unicast link check frames can be sent and the response to those packets is a data-ACK message which is representative for actual data exchange signals.

In respect of IEEE801.11-based, or WLAN-based, wireless networks the invention advantageously uses two properties of WLAN. One is the fact that IEEE 802.11 defines frames to which a device must send an acknowledgement, e.g. some action frames like ADDBA, or QoS data frames like QoS NULL. Using action frames or QoS data frame allows for determining the RSSI of a link which, as discussed before, is useful for establishing a basic link quality metric. Using QoS data frames at specific data rates is useful for so-called 'rate-probing', which allows for a more advanced link quality metric. The other is the fact that it is quite common in WLAN receiver implementations not to check for the BSSID value of an incoming frame, allowing the communication to be unicast rather than unreliable broadcast. Similar properties are also present in other wireless networks operating under different standards. However, the present invention, throughout this specification, will be described with reference to WLAN unless otherwise noted. It is readily apparent to the skilled person, however, that the present invention is applicable to other wireless network types and that it is not limited to WLAN-type networks.

A method in accordance with an aspect of the invention allows for controlling association of a mobile terminal to an access point in a wireless communication system comprising at least two access points. Each access point is adapted to provide data communication with the mobile terminal within a service area of the access point through a wireless interface over a selected one of a number of channels. In accordance with the method one or more further access points having service areas adjacent or overlapping with a service area of a first access point to which a first mobile terminal is associated are controlled to send probe request messages to the first mobile terminal. Then, for each of the one or more further access points and from a response received from the first mobile terminal in response to the corresponding probe request message, a respective first value representing a quality of a connection between the respective access point and the first mobile terminal is determined. Finally, each of the one or more further access points is controlled to selectively accept or reject a future association request from the first mobile terminal.

In accordance with the invention sending probe request messages may be repeated for each channel or for selected channels for increased accuracy.

In one embodiment of the invention the selection of the access points that accept or reject a future association request is based on a parameter indicating the quality of the connection between the AP and the MT. The quality of the connection may be judged using the signal strength, signal to noise ratio, interference with neighboring APs or other signal interferences and the like. It is also possible to use information about a data rate or modulation scheme for judging, since these properties typically also depend from the quality of a connection, or link quality. The modulation scheme, for example, may differ between links having a good signal strength and/or low interference and links showing low signal strength and/or high interference.

In another embodiment of the invention the selection of the access points that accept or reject a future association request is based on the number of MTs that are already associated with a respective AP.

In yet another embodiment of the invention the selection of the access points that accept or reject a future association request is based on the amount of data traffic a respective AP already handles.

The criteria for selection which AP is to accept or reject a future association request may be combined, using equal weights or different weights, and may also include further decision criteria as deemed appropriate for a network setup.

In an embodiment of the invention an AP that has been selected not to accept a future association request from a particular MT simply rejects such request using the existing protocols for association or disassociation. Other means of rejecting the association request include not answering the request, i.e. showing no reaction to such request.

In an embodiment of the invention the wireless interface of each one of the one or more further access points is initially set to a channel that is different from the channel over which the first mobile terminal is associated with the first access point. This is often the case when service areas of APs overlap and avoids interference or the creation of hidden nodes that could occur when the same channels are used. For each of the one or more further access points and prior to sending the probe request message to the first mobile terminal the wireless interface is switched to the channel over which the first mobile terminal is associated with the first access point. Then, the respective AP sends the probe request message and listens for a response. Upon expiration of a predetermined time after sending the probe request message or upon receiving a response to the probe request message, the AP switches back to the channel that was initially set. Switching channels is required for contacting the MT, since the MT will typically not be able to listen on other channels than the one that is currently set for communication with the AP to which the MT is associated. Performing communication with one AP on one channel and listening on other channels would require a MT having two independent wireless interfaces, which is costly to implement and thus rarely found.

In an embodiment the individual APs do not share the same identifier (SSID). The AP triggering the probing instructs the probing AP to use the triggering AP's SSID.

In another embodiment the probing APs use their own SSIDs, but the SSID is disregarded by the MT.

A MT can be identified and addressed for probing by its unique MAC address, or by an IP address used for communication with the AP it is currently associated with. The MAC and/or IP address of a MT to probe is for example transmitted in the message triggering the probing.

In an embodiment of the invention an AP has two independent wireless interfaces, one of which is handling traffic with associated MTs, and the other one is used for sending probe request messages. In a development of this embodiment, the two independent wireless interfaces are both used for handling traffic with associated MTs, but obviously the likelihood of both wireless interfaces being busy at the same time is reduced. Thus, one of the wireless interfaces can be used for sending probe requests, even if it is not the one that would actually be used for a future association of the MT.

In an embodiment of the invention switching channels for probing a MT is done only when there is no active wireless communication with other MTs attached to a respective AP. This prevents interfering with the data traffic of MTs that are already connected. The definition of 'no active communication' may also include a predetermined time interval of a given minimum size during which no wireless communication is active. This compensates for APs exhibiting slow channel switching properties.

In an embodiment of the invention only a selected number of channels within a range of channels is sequentially switched to during one probing period, with the remaining channels of the range of channels being probed in one or more subsequent probing periods.

In another embodiment the channels of the neighboring APs are stored at each AP. In this way the neighboring APs know the channels to be scanned depending on which AP sends a scan trigger message, whereby the scanning processes can be accelerated.

In another embodiment the channel to scan is transmitted in the probing trigger message sent to the neighboring APs, which likewise speeds up the scanning process.

In the disassociation process, the disassociating AP can inform the MT of the channel to scan for association, thereby also speeding up the handover process.

In an embodiment of the invention the AP with which a MT is currently associated monitors, continuously or at intervals, the quality of the connection with the MT. If the quality of the connection falls below a predetermined value, or is close to falling below, the AP sends messages to neighboring or adjacent APs, causing those APs to send probe request messages to the MT. In other words, the currently active AP for a MT triggers the probing performed in the neighboring or adjacent APs. The probing is done as described before. The neighboring or adjacent APs transmit the probing results to the AP that initiated the probing, which then instructs each of the neighboring APs to either accept or reject a future association request from the MT. Only APs told to accept an association request from the MT will respond to a MT-initiated discovery process.

Monitoring the quality of the connection and/or triggering sending the probe request messages may also be performed in one or more control units that are in communication with the APs, e.g. via a backbone network. In this embodiment the APs transmit, at intervals or event-triggered, status messages indicating the quality of the connection with MTs associated with them to the one or more control units.

In an embodiment of the invention the probe request messages include an ADDBA-request, or a QoS control frame. Generally, the probe request messages are of a type that must be responded to irrespective of whether or not an association between transmitter and receiver exists.

It is apparent that monitoring the quality of existing connections, triggering sending probe requests, evaluation of the responses to probe requests, and determining which AP will accept or request a future association request can be done de-centralized in selected ones of the APs in the network or in each AP, as required, or can be controlled by dedicated control units. One or more APs can act as AP and control unit at the same time, depending on their respective setup. Such centralized or semi-centralized control requires corresponding messages indicating link quality and effecting the control be exchanged as required or in intervals. However, the implementation of such message exchange is readily apparent to the skilled person and will not be discussed in detail. What is obvious is that the various embodiments described in this specification can be combined altogether or selectively. It will be clear to the skilled person that it is irrelevant which network component triggers the scan request, and which component makes the decision about which AP to accept or reject a future association request.

In accordance with an aspect of the invention the APs adjacent or neighboring to an AP that has a MT associated with receive, together with the command that triggers sending probe request messages, a minimum value for a link quality to be achieved with the MT. If the link quality between an AP and the MT is below that minimum value the respective AP itself decides to reject a future association request. This reduces the message exchange to some extent, and dispenses with the need for a control unit to decide, or for the AP that is currently associated with the MT to decide. However, the handover experience may suffer in case no AP establishes that the link quality is above the minimum value. Such exception would require appropriate handling.

In accordance with another aspect of the invention the results of the connection quality assessment of each of the APs adjacent or neighboring to the AP that has the MT associated with it is transmitted to each of the APs involved. Then, the AP having the best quality connection, or the a number of n APs ranking highest in the connection quality would accept a future association request, whereas the other APs would reject a future association request. This provides some resilience for the selection, and reduces the exchange of commands. The number of n APs ranking highest may be preset in the APs, or may be transmitted in the message triggering the probing.

The invention advantageously provides a faster handover process, since not all APs will have to respond to association requests from the MT. Further, a wireless network operator has improved control over which AP accepts an association request, which allows for load balancing across APs. Yet further, the implementation would be done in the network components, i.e. in the APs, and would not need any modification to existing mobile equipment. Yet further the inventive method is useful in systems in which multiple APs try to optimize a network connection of a MT, as it dispenses with the need to have dedicated hardware on board for estimating link characteristics between a target AP and a target MT, thus effectively lowering the system cost and making the optimization system affordable for consumers, unlike as before only possible for high end business customers.

As will be appreciated by one skilled in the art, aspects of the present invention can be embodied as a system, method or computer readable storage medium. Accordingly, aspects of the present invention can take the form of an embodiment entirely implemented in hardware, an embodiment entirely implemented in software, including firmware, resident software, micro-code, and so forth, or an embodiment combining software and hardware aspects that can all generally be referred to herein as a "circuit," "module", or "system." Furthermore, aspects of the present invention can take the form of a computer readable storage medium, for example storing software instructions that, when executed in a receiver for layered real-time streams, enable the receiver to execute the method. Any combination of one or more computer readable storage medium(s) may be utilized.

In this context a computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium includes, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The invention has been described hereinbefore using exemplary embodiments and developments. It is readily apparent that different embodiments and developments may be combined without departing from the spirit of the invention.

BRIEF DESCRIPTION OF THE DRAWINGS

In the following the invention will be described with reference to the drawings, in which.

In the figures like elements are designated with the same reference numerals.

Figure 1:
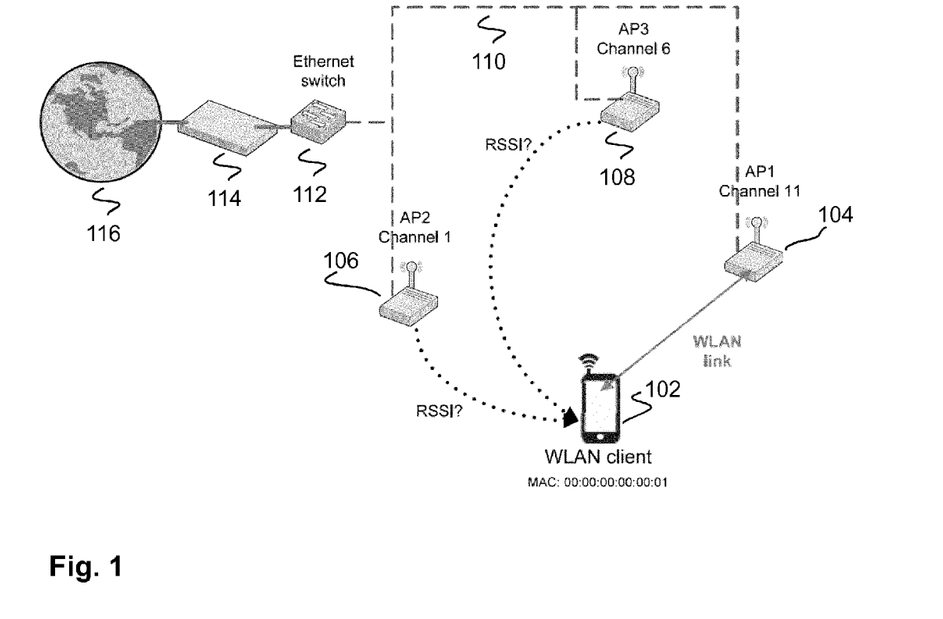
FIG. 1 is a schematic and simplified overview of a network architecture in which the inventive method is executed.

FIG. 1 shows a schematic and simplified overview of a network architecture in which the inventive method is executed. A mobile terminal (MT) 102 is connected wirelessly to a first access point (AP) 104. The connection is established over one of a plurality of channels. In the figure the connection is on channel 11. MT 102 is also within the service areas of a second and a third AP 106, 108. First, second and third APs 104, 106, 108 are also linked over a LAN 110, which is further connected to the internet 116 over a switch 112 and a router 114.

If, for some reason, first AP 104 decides that the link quality with MT 102 is not sufficient anymore, first AP 102 could simply disassociate MT 102 in order to force it to re-establish a better connection with one of the second or third APs 106, 108. Prior art approaches would leave it to MT 102 to figure out to which AP to connect. In accordance with the present invention the second and third APs 106, 108 will predetermine if MT 102 is allowed to associate with one of them. Since second AP 106 operates on channel 1, which is different from the channel that MT 102 and first AP 104 currently are linked on, second AP 106 cannot simply perform an evaluation of the link quality. The same is true for third AP 108. Hence, they would need to switch to the channel that MT 102 is currently using for assessing the link quality. Since neither of the second or third AP 106, 108 knows if or when the quality of the link between MT 102 and first AP 104 is insufficient they will only perform a link assessment upon a trigger signal. Such trigger signal is typically sent from the AP that is currently associated with the MT, in the figure first AP 104 would send such trigger signal, e.g. through LAN management protocol. Also, since the APs operate on different channels, and since MT 102 is only associated with first AP 104, and is not associated with second or third AP 106, 108, only a basic link assessment is possible, e.g. using RSSI. As discussed further above, when an AP is not busy transmitting or receiving, it can perform a scan on other than its own operating channels, for checking a link quality with a MT that might potentially associate in the future.

Since merely listening to a MT that potentially associates in the future, so-called sniffing, might not result in accurate RSSI readings, so-called 'action frames', e.g. ADDBA request, or QoS control frames, e.g. QoS NULL, subtype 1100, for determining RSSI can be used. Any device receiving such transmissions must reply with either an ACK message or a 'rejected because OBSS request'-message. The resulting RSSI reading is then used for determining whether to accept or reject future association requests from the MT.

In FIG. 1 the RSSI readings from second and third AP 106, 108 are transmitted to first AP 104, which can decide to maintain the existing association, e.g. because the other links have an even less quality than the existing link, or can instruct one of the second and third APs 106, 108 to accept an impending association request from MT 102, and then disassociate with MT 102.

Figure 2:
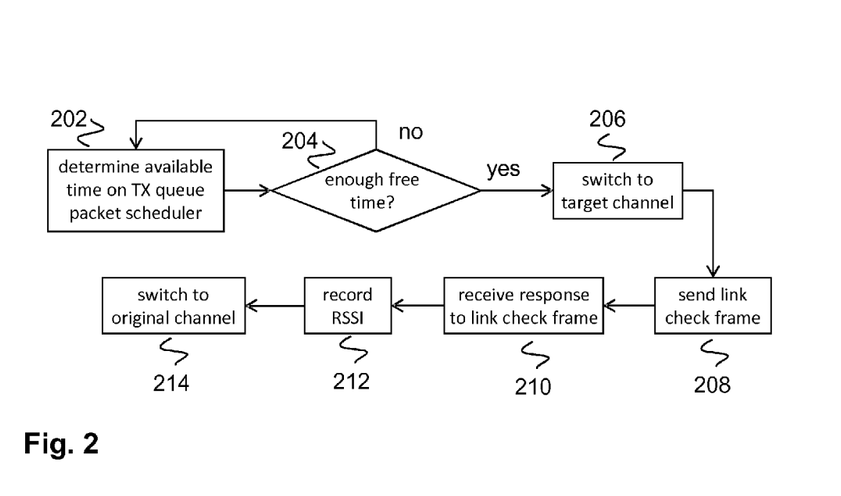
FIG. 2 represents an exemplary schematic flow diagram of an embodiment of the method.

FIG. 2 shows an exemplary flow diagram of an embodiment of a method in accordance with the invention. The flow diagram depicts the method steps as performed in an AP in accordance with the invention, once it has received a trigger to perform the off channel link check. Step 202 determines the available 'free' time for performing the off channel link check. If no sufficient time is available, 'no'-branch of step 204, checking the available time is repeated. If sufficient time is available for performing the off channel link check, in full or partially, the AP switches to a target channel that is different from its initial or 'own' channel it normally operates on, step 206. Then, the AP sends a link check frame, step 208, receives a response to the link check frame, step 210, and records the RSSI reading, step 212. Sending and receiving the link check frames may be repeated for increased accuracy. Finally, the AP switches back to the initial channel it operated on before, step 214.

Figure 3:
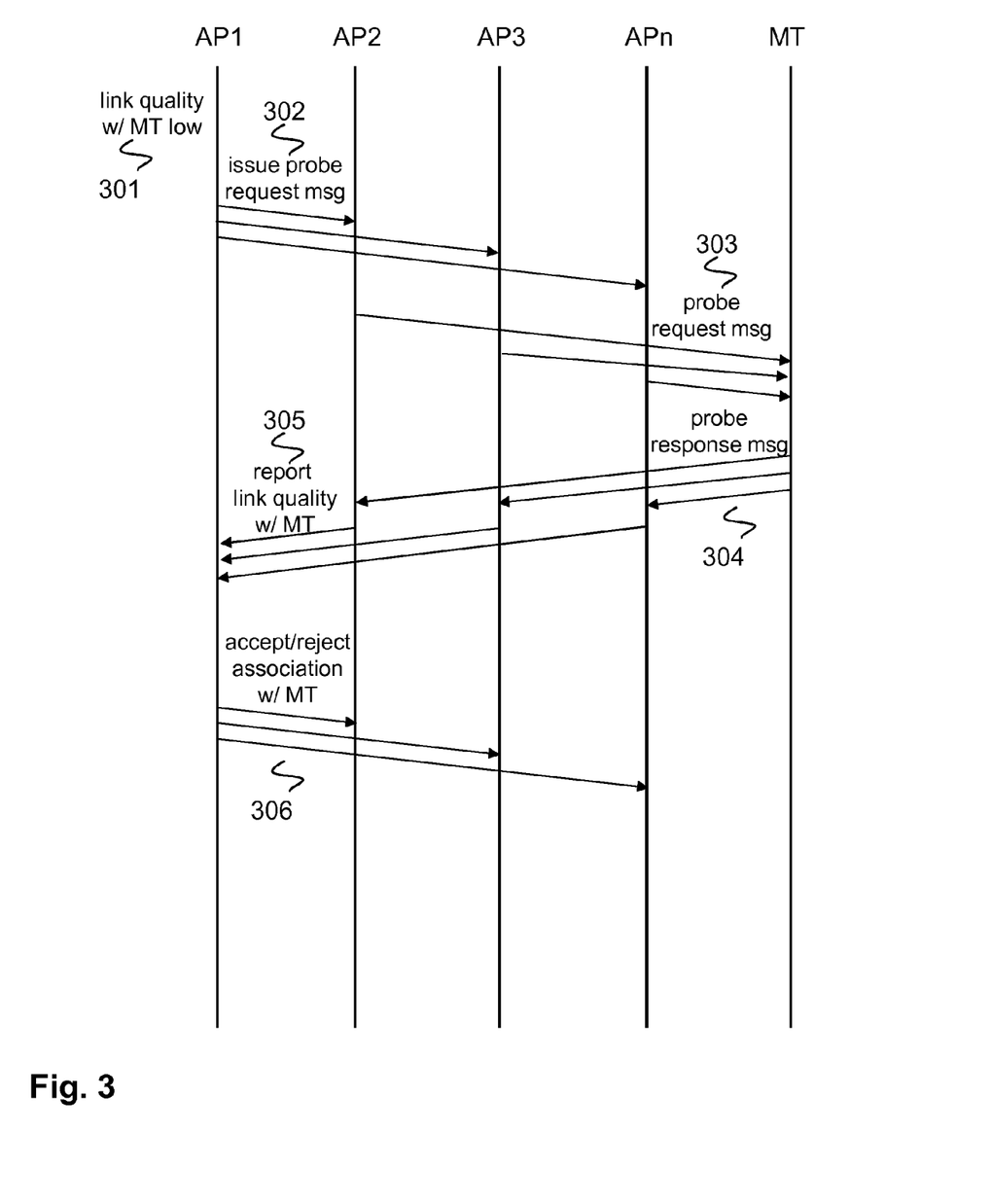
FIG. 3 shows an exemplary message flow diagram in accordance with a first aspect of the invention.

FIG. 3 shows an exemplary message flow diagram in accordance with a first aspect of the invention. When AP 1, which has an active association with MT, determines that the link quality is below a predetermined threshold, step 301, it sends a message to AP2, AP3, . . . , APn, triggering those APs to issue probe request messages to MT, step 302. Each of the addressed APs subsequently sends the probe request messages to MT, step 303, and receives corresponding responses, step 304. Once the addressed APs have received responses they determine the link quality and report the determined link quality to AP1 that initiated the probing, step 305. AP1, after receiving reports on the link quality from all addressed APs, selects one or more of the APs as appropriate for future association with MT, and instructs the APs accordingly to accept or reject future association requests from MT, step 306.

Figure 4:
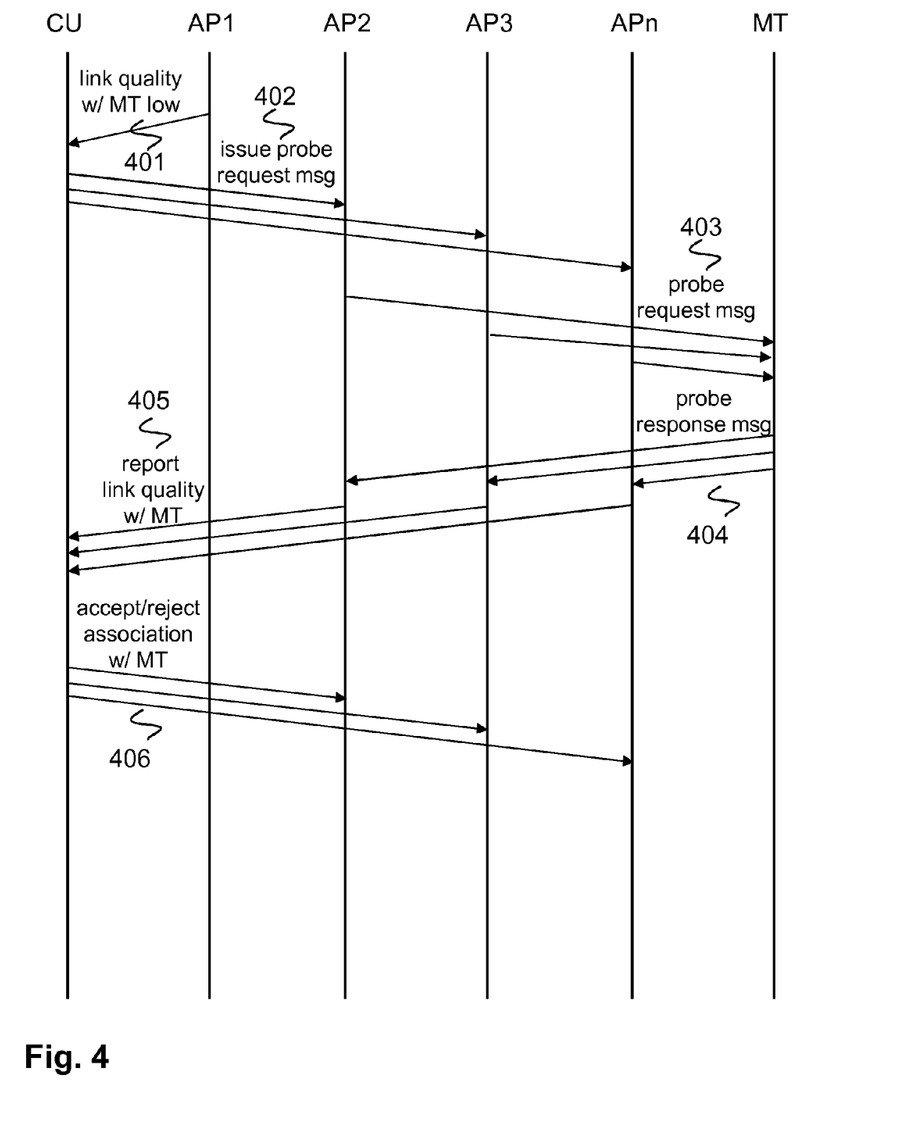
FIG. 4 shows an exemplary message flow diagram in accordance with a second aspect of the invention.

FIG. 4 shows an exemplary message flow diagram in accordance with a second aspect of the invention. The initial situation corresponds to the one described in FIG. 3: AP1 has an active association with MT and determines that the link quality is below a predetermined threshold, but, unlike as shown in FIG. 3, in FIG. 4 a control unit CU is present, which coordinates and controls the association of MT to any of the APs. AP1 sends a message to CU, informing CU about a low link quality, step 401. CU sends a message to AP2, AP3, . . . , APn, triggering those APs to issue probe request messages to MT, step 402. Each of the addressed APs subsequently sends the probe request messages to MT, step 403, and receives corresponding responses, step 404. Once the addressed APs have received responses they determine the link quality and report the determined link quality to CU that initiated the probing, step 405. CU, after receiving reports on the link quality from all addressed APs, selects one or more of the APs as appropriate for future association with MT, and instructs the APs accordingly to accept or reject future association requests from MT, step 406.

Figure 5:
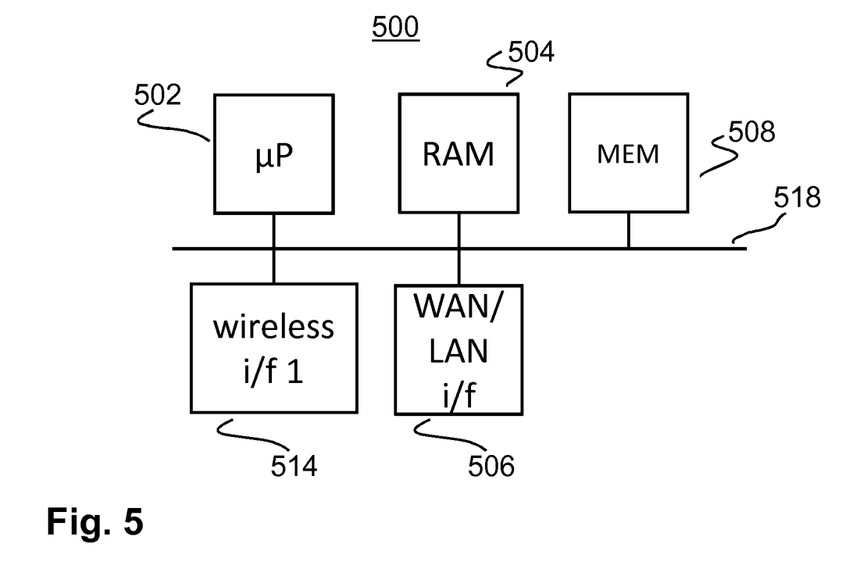
FIG. 5 is an exemplary schematic block diagram of a first AP in accordance with the invention.

FIG. 5 shows an exemplary schematic block diagram of a first AP 500 suitable to perform a method in accordance with the invention. Microprocessor 502 is linked to random access memory (RAM) 504, wide area network (WAN) and/or local area network (LAN) interface 506, non-volatile memory 508 and wireless interface 516 via data bus 518. Data bus 518 is not necessarily a single data bus but may also be implemented as a system of separate buses each connecting all or only some components of the AP, as appropriate and required for control and data flow. Non-volatile memory 508 holds program instructions which, when executed by microprocessor 502, perform one or more of the various aspects and embodiments of the method described in this patent specification. The microprocessor is of a commonly known and used type and may be constructed in accordance with any suitable one of the known architectures, e.g. x86, x86-64, ARM, MIPS, etc. Random access memory 504 may temporarily store data and/or program instructions when performing the method. The non-volatile memory may be implemented through hard disk drives (HDD), Flash-Memory, or a combination thereof. Other non-volatile memory types such as MRAM, optical storage, etc. can also be used in the AP without leaving the scope of the present invention.

Figure 6:
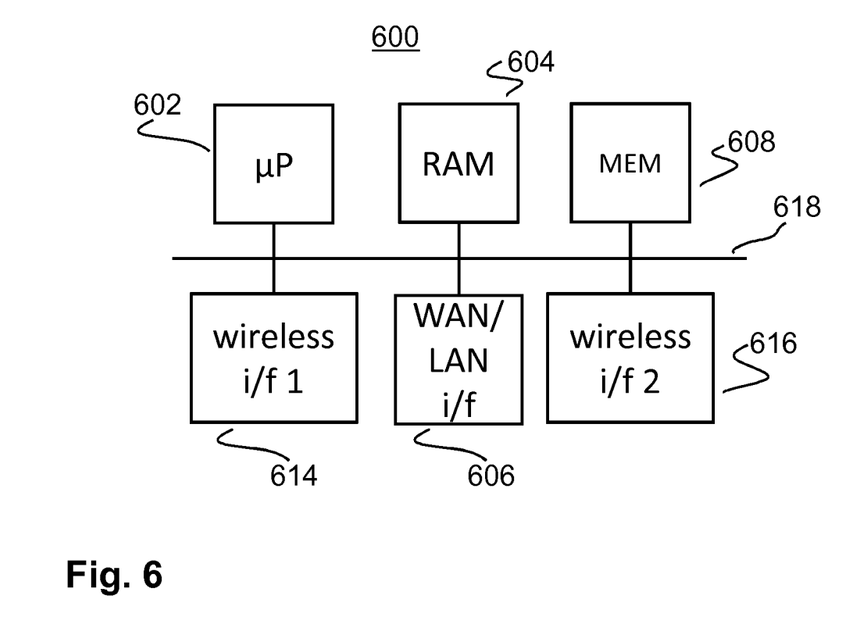
FIG. 6 is an exemplary schematic block diagram of a second AP in accordance with the invention.

FIG. 6 is an exemplary schematic block diagram of a second AP 600 in accordance with the invention. AP 600 comprises all elements shown and discussed with reference to FIG. 5, and the corresponding elements are referenced with similar reference numerals in the 600-range. In addition to the AP shown in FIG. 5 AP 600 of FIG. 6 has a second wireless interface, allowing for concurrent data traffic with one or more associated MTs and probing link quality with non-associated MTs, as described further above in one or more aspects of the invention.

It will be appreciated by those skilled in the art that the block diagrams presented herein represent conceptual views of illustrative system components and/or circuitry embodying the principles of the invention. Similarly, it will be appreciated that any flow charts and the like represent various processes which may be substantially represented in computer readable storage media and so executed by a computer or processor, whether or not such computer or processor is explicitly shown.

Although the invention was described above with reference to the examples shown in the appended drawings, it is obvious that the invention is not limited to these, but may be modified by those skilled in the art without departing from the scope and spirit of the invention. For example, the invention is not restricted to WLAN networks according to the IEEE 802.11 standard only, but can be used in connection with other wireless systems, such as systems based on the BRAN (Broadband Radio Access Networks) standard, or any other network type in which a MT is connected to a single AP at a time.

The invention claimed is:

1. A method of controlling an association of a mobile terminal with at least a first access point in a wireless communication system comprising at least two access points, the mobile terminal being associated to a second access point, the method comprising:
   the first access point receiving, from a network equipment of the wireless communication system, a command to send probe request messages to the mobile terminal;
   the first access point determining, from a response received from the mobile terminal in response to the corresponding probe request message, a value representing a quality of a connection between the first access point and the mobile terminal;
   the first access point transmitting the value representing the quality of the connection between the first access point and the mobile terminal to said network equipment; and
      the access points receiving a command to selectively accept or reject a future association request issued by the mobile terminal, based on the transmitted value representing the quality of the connection between the first access point and the mobile terminal.

2. The method of claim 1, wherein a wireless interface of said first access point is initially set to a channel that is different from a channel over which the mobile terminal is associated with the second access point, wherein, prior to sending the probe request message to the mobile terminal, the method further includes:
   switching the wireless interface of the first access point to the channel over which the mobile terminal is associated with the second access point, and, upon expiration of a predetermined time after sending the probe request message or upon receiving a response to the probe request message, switching to the channel that was initially set.

3. The method of claim 1, further including sending probe request messages only in a time interval during which the first access point performs no active wireless communication with another mobile terminal associated to said first access point.

4. The method of claim 1, wherein the command to send probe request messages is received from the second access point or from a control unit that is in communication with the at least two access points of the wireless communication system.

5. The method of claim 1, wherein the command controlling the first access point to selectively accept or reject an association request from the mobile terminal is received from the second access point or from a control unit that is in communication with the at least two access points of the wireless communication system, in response to messages received from the first access points transmitting the respective values.

6. The method of claim 1, wherein the probe request message is of a type that must be responded to irrespective of an established association with an access point, including an ADDBA-request or a QoS control frame.

7. The method of claim 1, wherein the first access point transmits status messages including a value indicating a quality of a connection with another mobile terminal to the network equipment.

8. A method for managing an association of a mobile terminal to at least a first access point in a wireless communication system comprising at least two access points and a network equipment, the mobile terminal being associated to a second access point, the method comprising:
   the network equipment sending a message to the first access point triggering the sending, by the first access point, of a probe request message to the mobile terminal;
   the network equipment receiving, from the first access point, a value representing a quality of a connection between the first access point and the mobile terminal determined by said first access point; and
   the network equipment sending a command, to the first access point, to selectively accept or reject a future association request issued by the mobile terminal based on the value representing the quality of the connection between the first access point and the mobile terminal.

9. The method according to claim 8, further including monitoring one or more attributes of a connection between the second access point and the mobile terminal, determining, from the monitored attributes, a second value representing the quality of the connection, and triggering sending the command to the first access point to send probe request messages only in case the second value is at or below a predetermined value.

10. An access point intended to control an association with a mobile terminal in a wireless communication system comprising at least two access points, the mobile terminal being associated to another access point, the access point comprising a processor configured to:

receive, from a network equipment of the wireless communication system, a command to send probe request messages to the mobile terminal;

determine, from a response received from the mobile terminal in response to the corresponding probe request message, a value representing a quality of a connection between the access point and the mobile terminal;

transmit the value representing the quality of the connection between the first access point and the mobile terminal to said network equipment; and the access points receiving a command to selectively accept or reject a future association request issued by the mobile terminal, based on the transmitted value representing the quality of the connection between the access point and the mobile terminal.

11. The access point according to claim 10, comprising a wireless interface initially set to a channel that is different from a channel over which the mobile terminal is associated with the second access point, wherein, prior to sending the probe request message to the mobile terminal, the processor is further configured to:

switch the wireless interface to the channel over which the mobile terminal is associated with the second access point, and, upon expiration of a predetermined time after sending the probe request message or upon receiving a response to the probe request message, switch to the channel that was initially set.

12. The access point according to claim 10, wherein the processor is further configured to include sending probe request messages only in a time interval during which the first access point performs no active wireless communication with another mobile terminal associated to said first access point.

13. A network equipment intended to manage an association of a mobile terminal with at least a first access point in a wireless communication system comprising at least two access points, the mobile terminal being associated to a second access point, the network equipment comprising a processor configured to:

send a message to the first access point triggering the sending, by the first access point, of a probe request messages to the mobile terminal;

receive, from the first access point, a value representing a quality of a connection between the first access point and the mobile terminal determined by said first access point; and send a command, to the first access point, to selectively accept or reject a future association request issued by the mobile terminal based on the value representing the quality of the connection between the first access point and the mobile terminal.

14. The network equipment according to claim 13, wherein the processor is further configured to monitor one or more attributes of a connection between the second access point and the mobile terminal, determine, from the monitored attributes, a second value representing the quality of the connection, and trigger sending the command to the first access point to send probe request messages only in case the second value is at or below a predetermined value.

* * * * *